United States Patent
Sugimoto

(10) Patent No.: US 8,075,018 B2
(45) Date of Patent: Dec. 13, 2011

(54) AIRBAG AND AIRBAG DEVICE

(75) Inventor: Shinichi Sugimoto, Tokyo (JP)

(73) Assignee: Takata Corporation, Tokyo (JP)

( * ) Notice: Subject to any disclaimer, the term of this patent is extended or adjusted under 35 U.S.C. 154(b) by 17 days.

(21) Appl. No.: 12/457,966

(22) Filed: Jun. 26, 2009

(65) Prior Publication Data

US 2010/0052300 A1 Mar. 4, 2010

(30) Foreign Application Priority Data

Aug. 28, 2008 (JP) ................................ 2008-219025

(51) Int. Cl.
*B60R 21/16* (2006.01)

(52) U.S. Cl. .................................................. 280/743.1
(58) Field of Classification Search ............... 280/728.2, 280/730.2, 743.1
See application file for complete search history.

(56) References Cited

U.S. PATENT DOCUMENTS

| | | | | | |
|---|---|---|---|---|---|
| 5,310,216 | A | * | 5/1994 | Wehner et al. | 280/743.1 |
| 5,549,326 | A | * | 8/1996 | Rodriguez Ramos | 280/743.1 |
| 5,562,301 | A | * | 10/1996 | Lutz | 280/728.2 |
| 5,671,935 | A | | 9/1997 | Berger et al. | |
| 5,765,867 | A | * | 6/1998 | French | 280/743.2 |
| 5,857,696 | A | * | 1/1999 | Inoue et al. | 280/728.2 |
| 5,997,036 | A | * | 12/1999 | Hamada | 280/743.1 |
| 6,076,850 | A | * | 6/2000 | Kreuzer et al. | 280/728.2 |
| 6,180,204 | B1 | * | 1/2001 | Keshavaraj | 428/81 |
| 2004/0195808 | A1 | * | 10/2004 | Amamori | 280/728.2 |

FOREIGN PATENT DOCUMENTS

JP 2008-105446 A 5/2008
JP 2008105446 A * 5/2008

* cited by examiner

*Primary Examiner* — Paul N Dickson
*Assistant Examiner* — Robert A Coker
(74) *Attorney, Agent, or Firm* — Manabu Kanesaka

(57) ABSTRACT

An airbag for restraining an occupant includes a sheet-shaped web having a predetermined shape and a circumferential edge. The web is folded and arranged such that the circumferential edge is overlapped and gathered substantially in one location of the web and joined together so as to form a substantially sealed inner space inside the airbag.

9 Claims, 18 Drawing Sheets

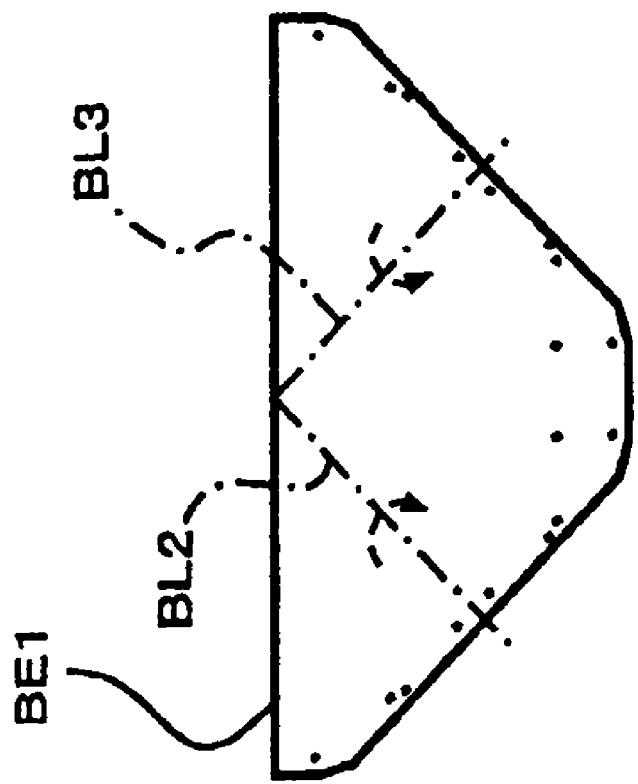
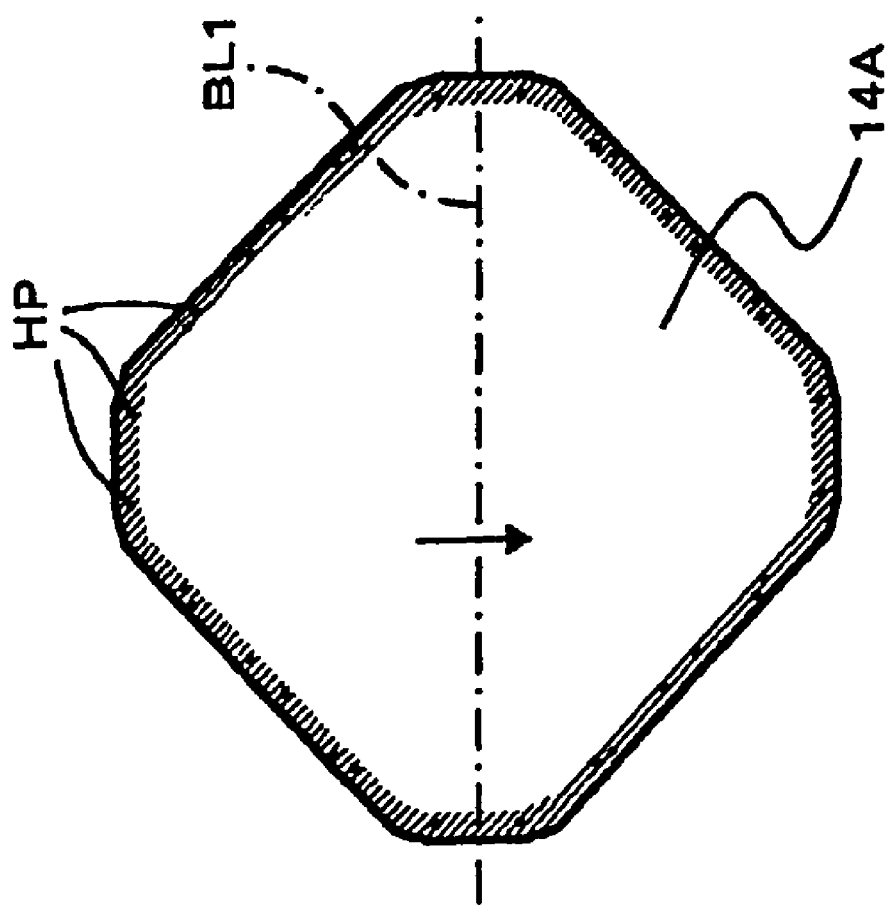
Fig. 2(a)
Fig. 2(b)

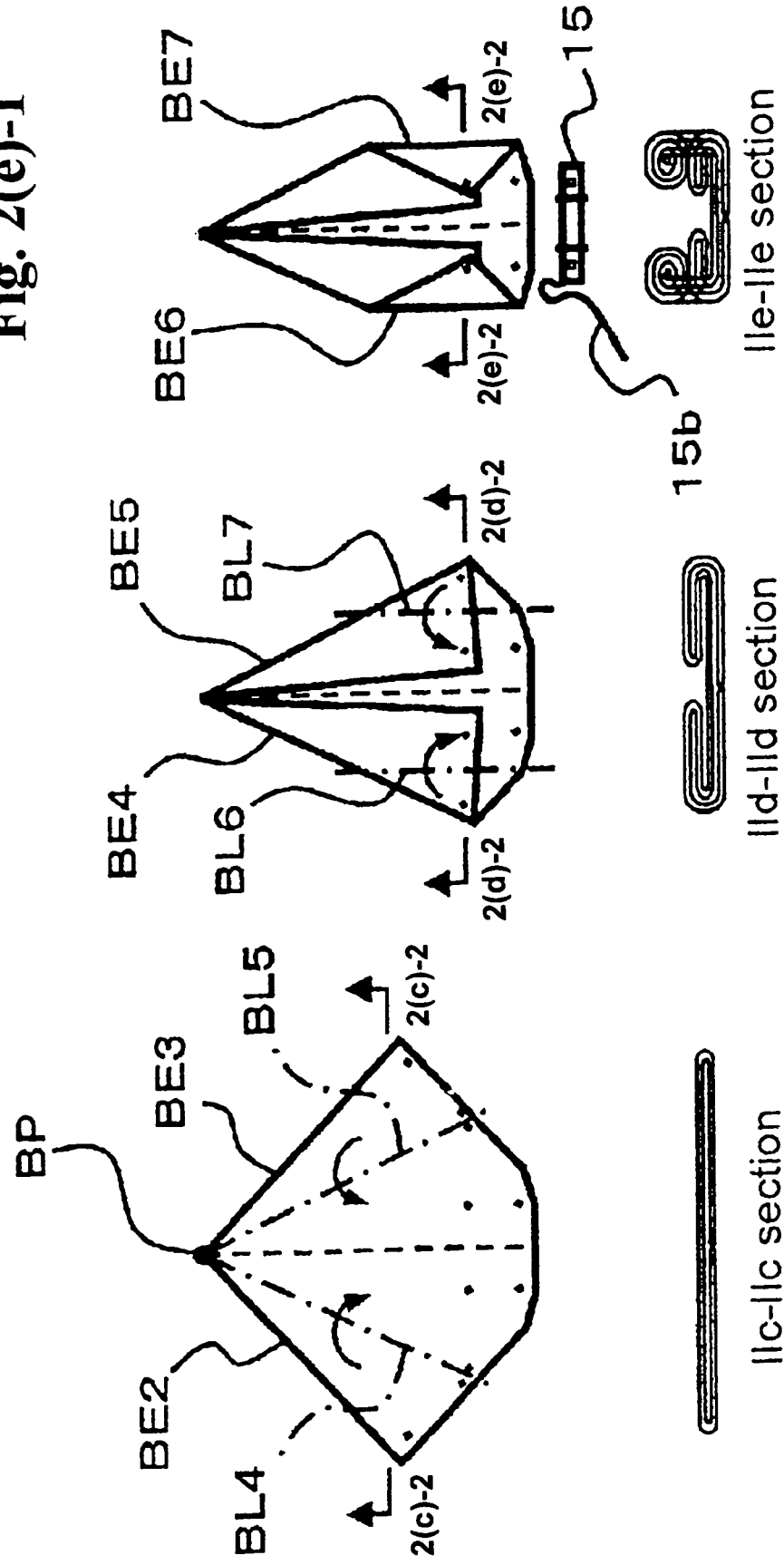

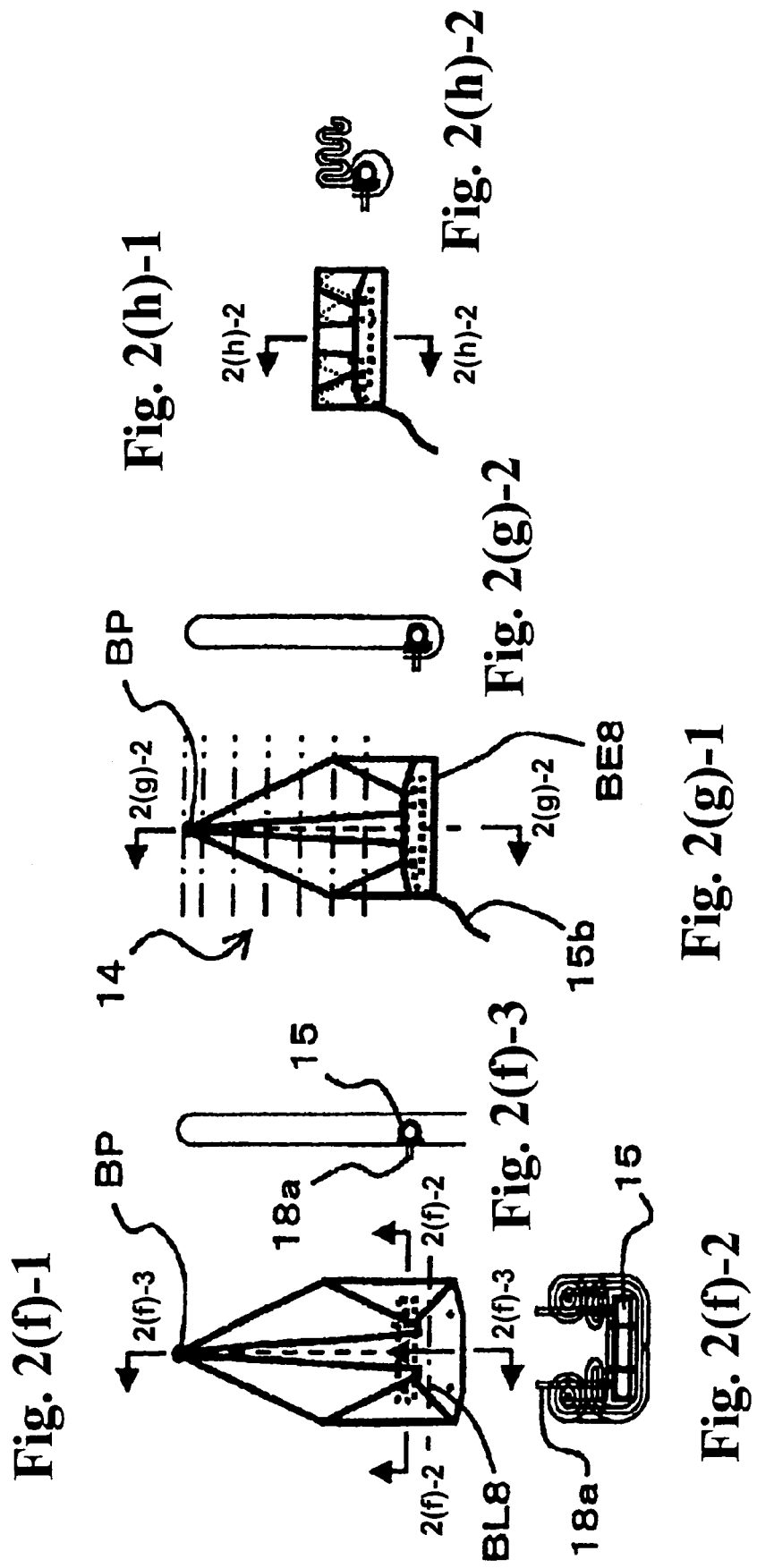

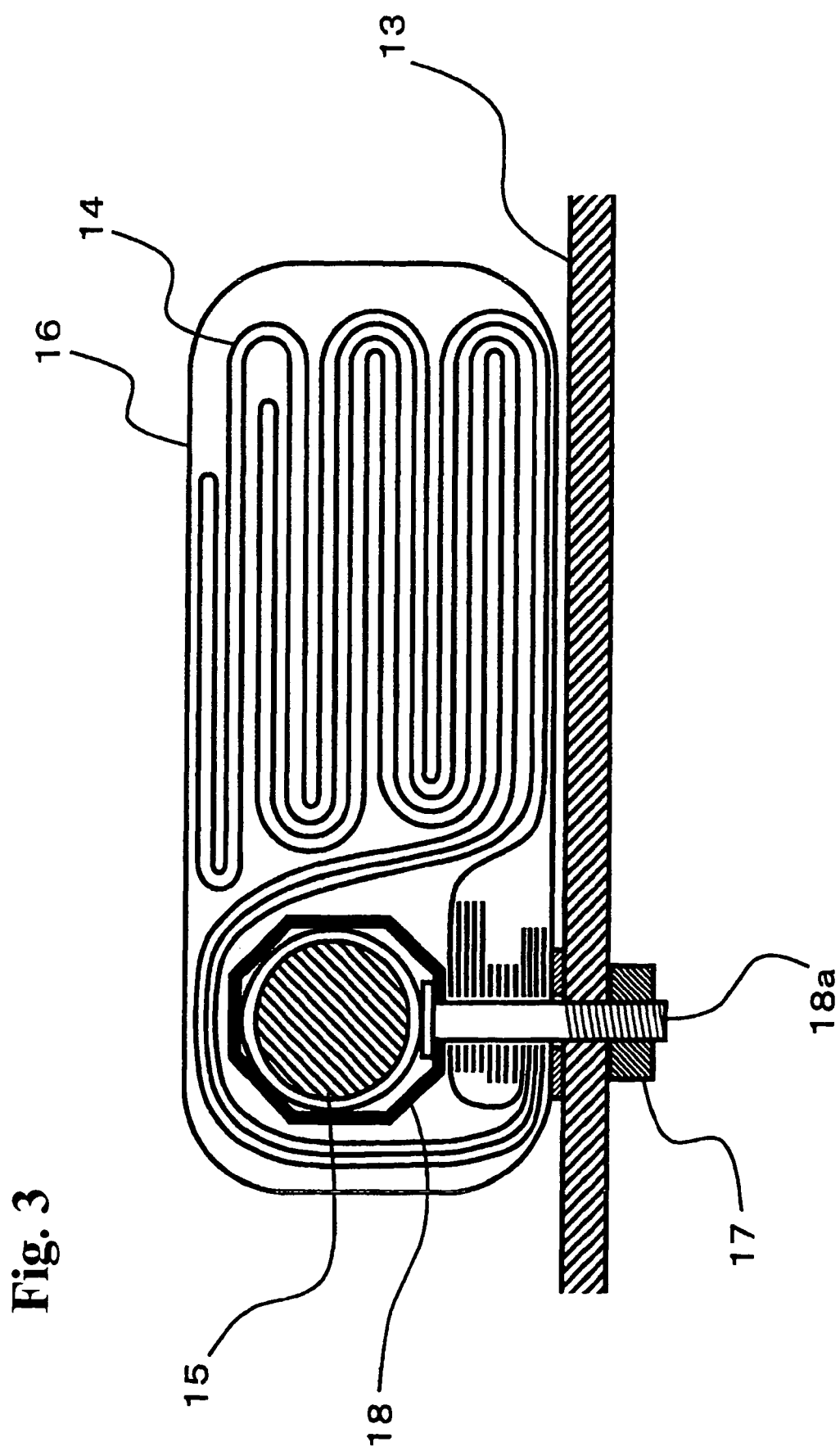

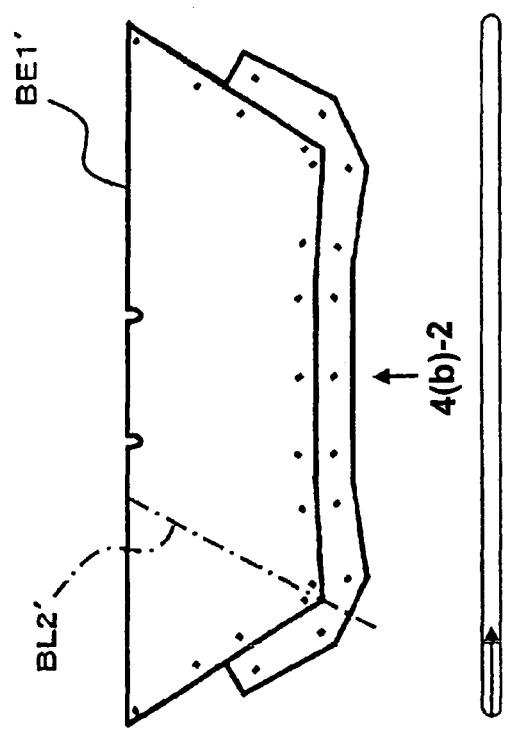
Fig. 4(b)-1
Fig. 4(b)-2
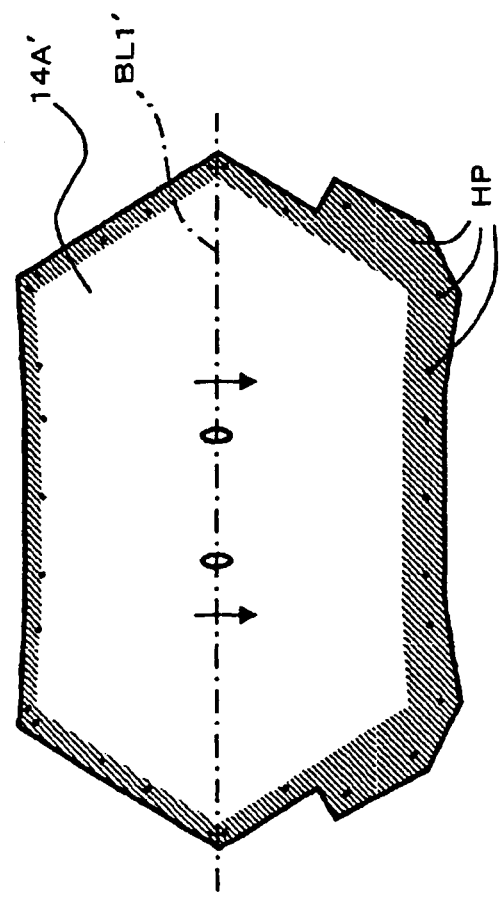
Fig. 4(a)

Fig. 4(c)-1
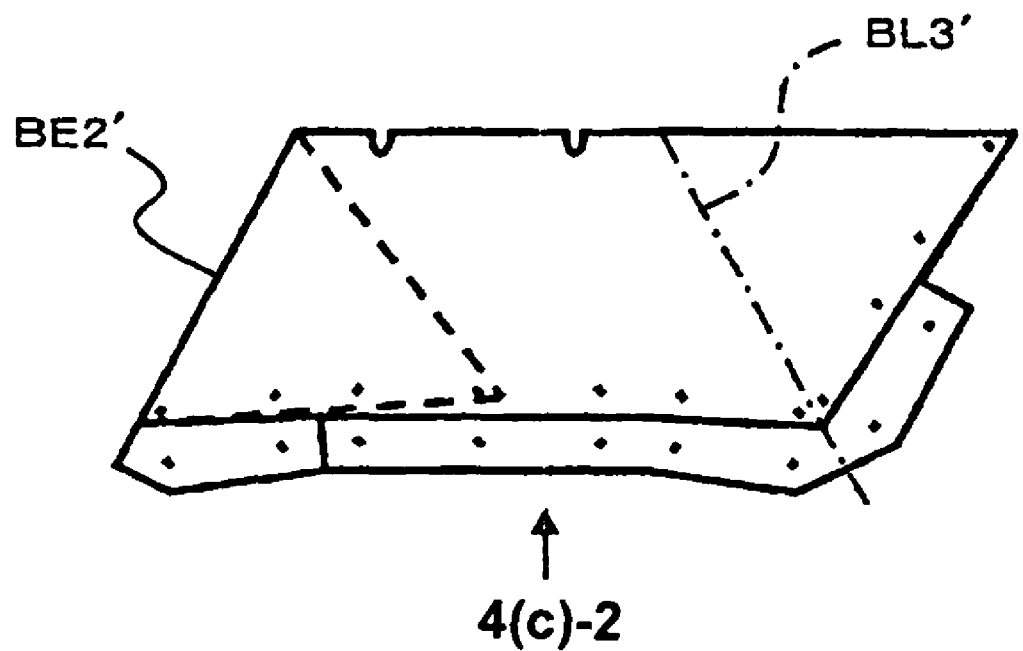
4(c)-2
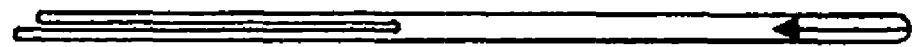
Fig. 4(c)-2

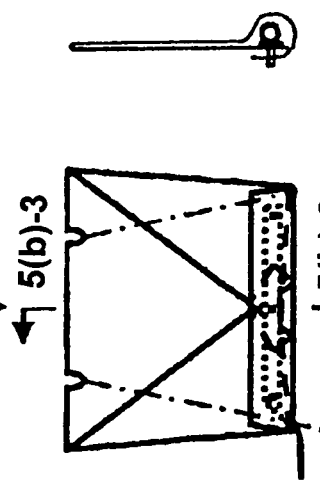
Fig. 5(b)-2
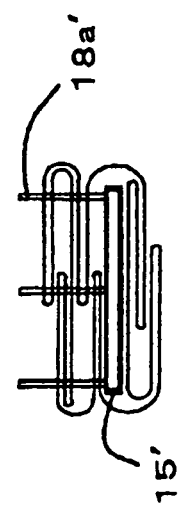
Fig. 5(b)-3
Fig. 5(b)-1
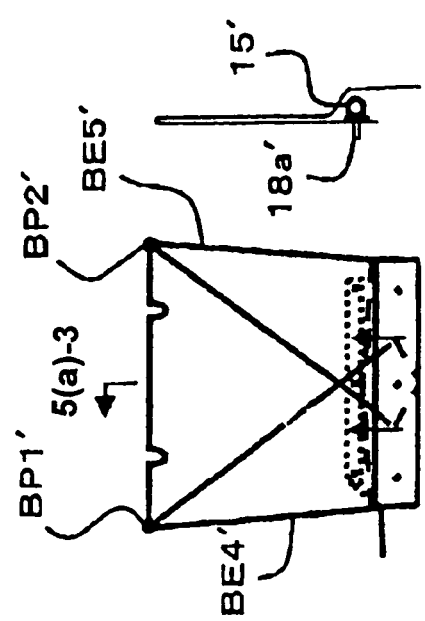
Fig. 5(a)-1
Fig. 5(a)-3
Fig. 5(a)-2

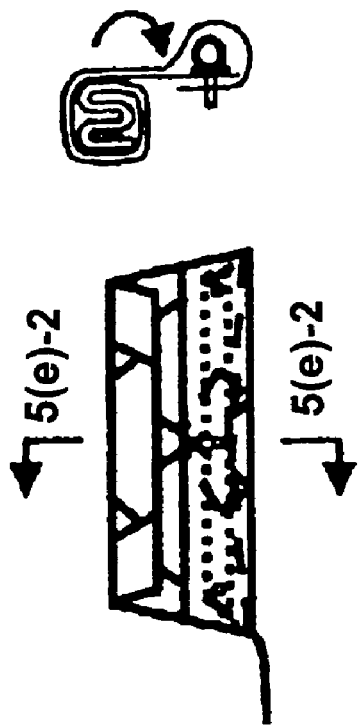
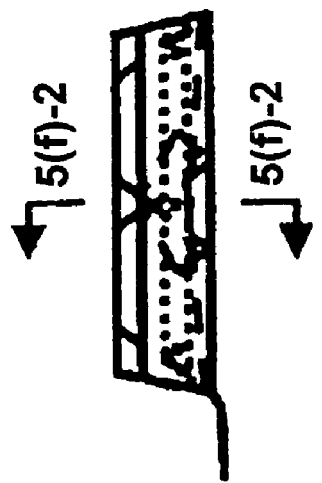
Fig. 5(e)-2
Fig. 5(e)-1
Fig. 5(f)-2
Fig. 5(f)-1

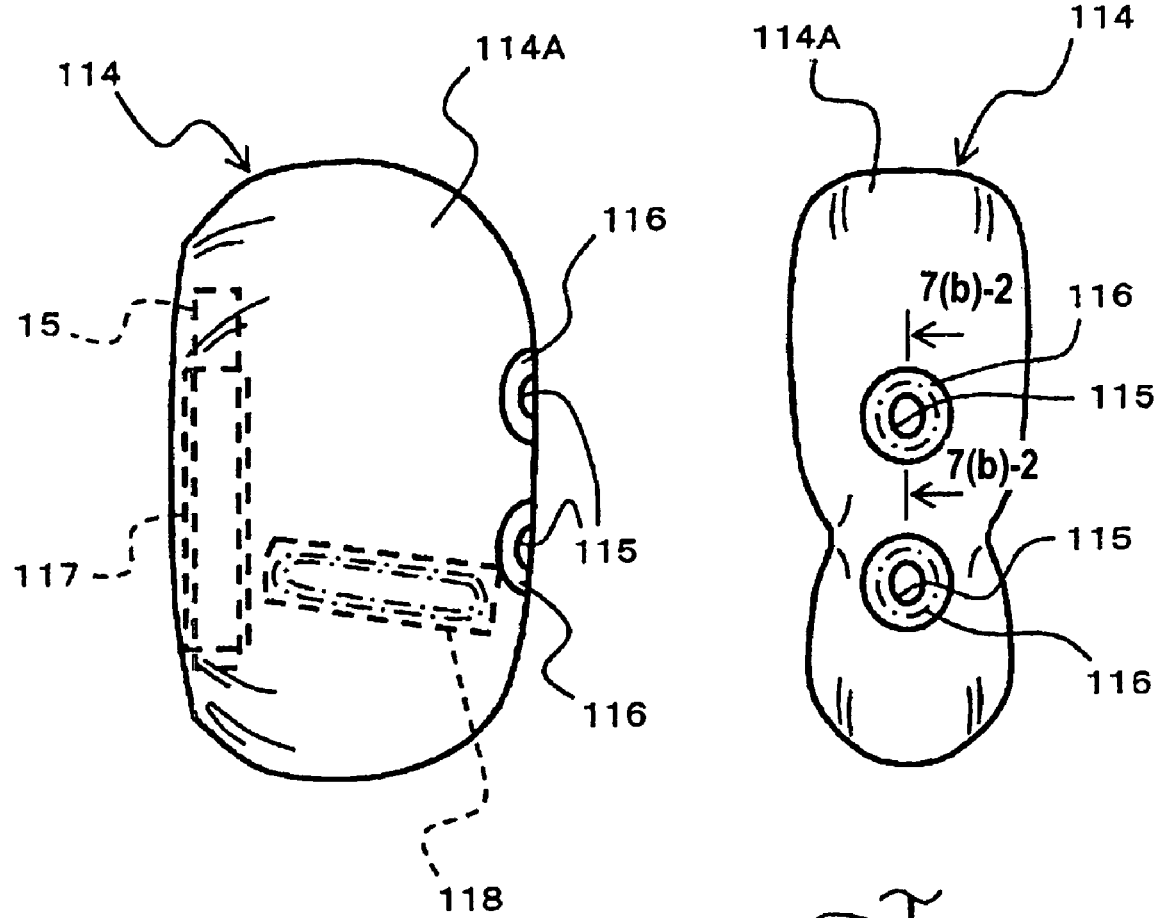
Fig. 7(b)-1
Fig. 7(a)
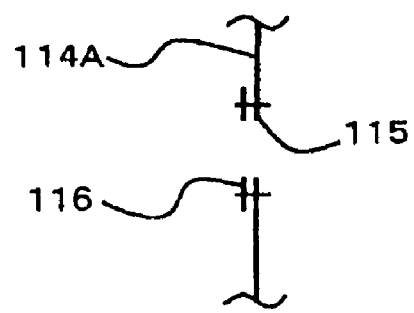
Fig. 7(b)-2

Fig. 7(c)-2
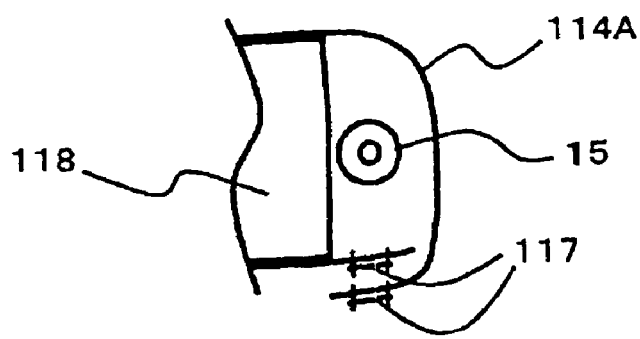
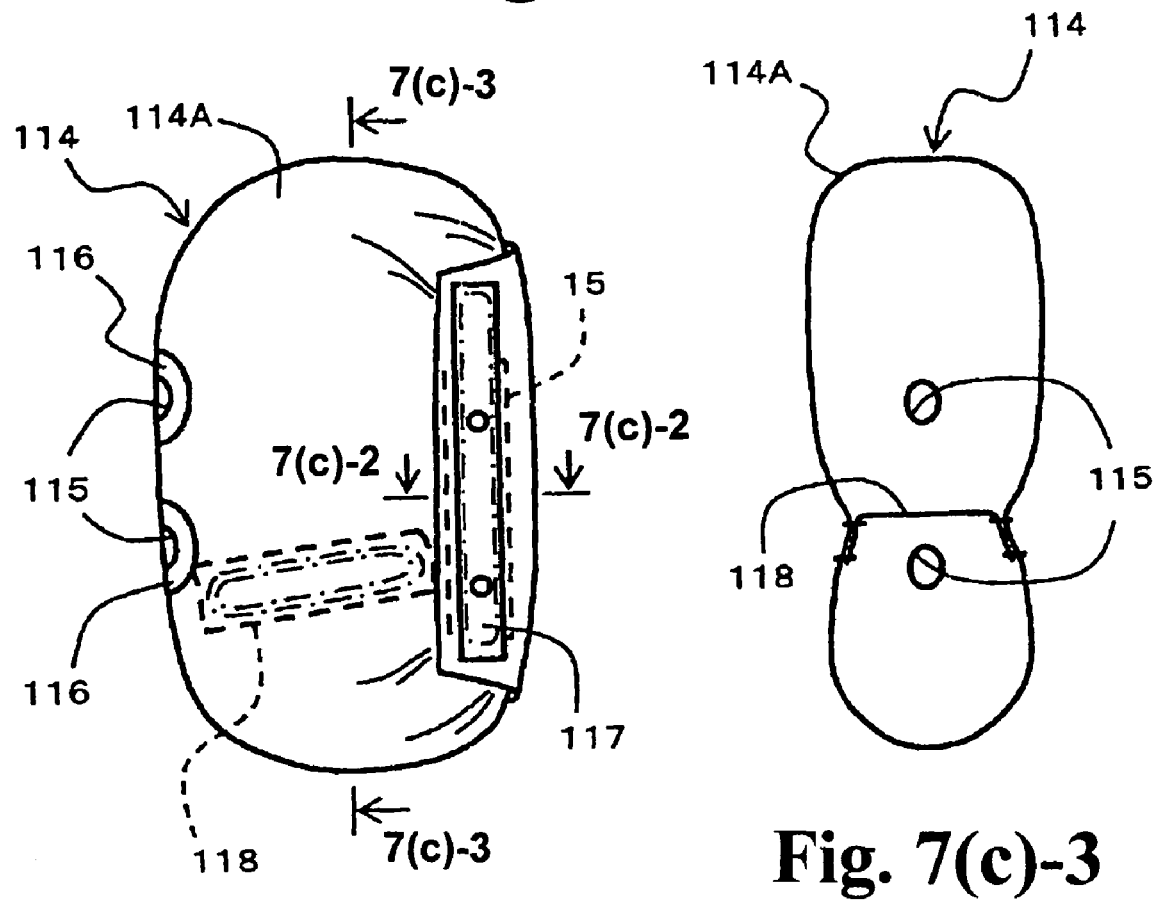
Fig. 7(c)-1
Fig. 7(c)-3

VIII-VIII section

AIRBAG AND AIRBAG DEVICE

BACKGROUND OF THE INVENTION AND RELATED ART STATEMENT

The present invention relates to an airbag installed on a motor vehicle such as an automobile and an airbag device provided with such an airbag.

An airbag device generally includes an airbag for receiving a body of an occupant and a gas generator housed in the airbag for releasing gas to inflate the airbag. According to one of the methods for manufacturing an airbag for use in such an airbag device, an airbag is formed as a bag by subjecting a sheet-shaped web to a combination of folding and sewing (see, for example, Patent Document 1: Japanese Unexamined Patent Application Publication (Translation of PCT Application) No. 8-506296)

A conventional airbag described above is constructed as a bag prepared by folding a sheet-shaped web cut into a predetermined shape along a predetermined folding line and finally sewing free edges with each another. A circumferential sewing such as sewing free edges with each other is an important process that particularly affects the air-tightness and strength of an airbag, and has a significant effect on the inflation/deployment performance and the restraint performance of the airbag. Accordingly, a circumferential sewing process for free edges includes a sewing process for a long sewing section, as compared to other supplemental sewing such as an installation of a reinforcement cloth or the like, accounting for a relatively large part of airbag manufacturing cost. For these reasons, there is a need for an airbag to reduce the manufacturing cost.

An object of the present invention is to provide an airbag and an airbag device having the airbag so as to significantly reduce the manufacturing cost by eliminating the need for the circumferential sewing process.

Further objects and advantages of the invention will be apparent from the following description of the invention.

SUMMARY OF THE INVENTION

To achieve the above mentioned object, in the first aspect of the present invention, an airbag restrains a body of an occupant, wherein a substantially sealed inner space is formed inside the airbag by folding a sheet-shaped web in a predetermined shape in such a manner that all the circumferential edges are gathered and joined together.

In constructing a bag with a sheet-shaped web, the edges of the web may be joined into one, or open edges formed by overlapping edges and middle portions may be joined into one to ensure so that the inner space of the bag is airtight. According to the first aspect of the present invention, the web is folded in such a manner that all the circumferential edges are gathered together, and all the circumferential edges are joined all together so as to ensure air-tightness, thereby forming a bag having a sealed inner space thereinside. As described above, an airbag constituting a bag can be formed by subjecting a sheet-shaped web to folding and joining processes only, thereby eliminating the need for a circumferential sewing process that requires sewing relatively long sewing sections, and significantly reducing the manufacturing cost.

The second aspect of the present invention is that joining members are provided for joining all the circumferential edges which are gathered together to substantially one location and overlapped each another.

This allows all the circumferential edges of the web to be more easily and stably joined than welding or sewing.

The third aspect of the present invention is that all the circumferential edges are gathered close to a fixed portion for mounting the airbag.

This configuration allows all the circumferential edges to be overlapped all together and joined to be secured to a vicinity of the fixed portion for mounting the airbag in a statically and dynamically stable manner, thereby allowing the airbag to be inflated and deployed smoothly.

The fourth aspect of the present invention is that the joining members bring a member to which the airbag is mounted and all the circumferential edges into close contact with each other and sandwich them therebetween, thereby securing the airbag and joining all the circumferential edges at the same time.

This configuration allows one (one set of) joining member to stably join all the circumferential edges and secure the airbag, thereby achieving the compact airbag as a whole.

The fifth aspect of the present invention is that a first folding side in a closed state is formed by folding the web once, and, in addition, at least one second folding side in a closed state is formed by folding so as to intersect with the first folding side.

This allows all the circumferential edges resulting from formation of the first folding side to be gathered at a narrower region and folded together as a result of the formation of the second folding sides. This causes all the circumferential edges to concentrate on substantially one location, thereby allowing air-tight joining.

The sixth aspect of the present invention is that a protection cover for covering the airbag folded to a minimum size is provided.

This allows the airbag to be kept in a minimum size, enabling easy handling.

In order to achieve the aforementioned objects, the seventh aspect of the present invention is that an airbag according to any one of the preceding aspects 1 to 6 of the present invention and a gas generator for releasing gas to inflate the airbag are provided.

This eliminates the need for a circumferential sewing process in the airbag manufacturing process, resulting in a significant reduction in manufacturing cost.

The eighth aspect of the present invention is that the gas generator is secured to the joining members.

This allows the gas generator to be secured in a stable manner and to reduce a size of the airbag as a whole.

The ninth aspect of the present invention is that insertion holes for inserting an insertion member of the joining members for mounting the gas generator are provided at all the circumferential edges which are overlapped each other, whereby all the circumferential edges are joined by inserting the inserting member of the joining members through the insertion hole.

This arrangement allows the insertion holes to be overlapped each other so as to be aligned with each other to enable the inserting member to be inserted, thereby allowing the web to be folded with high precision.

The present invention eliminates the need for a circumferential sewing process, thereby significantly reducing manufacturing cost.

BRIEF DESCRIPTION OF THE DRAWINGS

FIGS. 2(a) to 2(h)-2 are views showing manufacturing processes of the side impact airbag device, wherein FIG. 2(a) shows a plan view of the web; FIG. 2(b) shows a state wherein the web is folded along a diagonal line of the web; FIG. 2(c)-1 shows a state after the web is folded along lines BL2, BL3 in FIG. 2(b); FIG. 2(c)-2 is a sectional view taken along a line 2(c)-2-2(c)-2 in FIG. 2(c)-1; FIG. 2(d)-1 shows a state after the web is further folded along lines BL4, BL5 in FIG. 2(c)-2; FIG. 2(d)-2 is a sectional view taken along a line 2(d)-2-2(d)-2 in FIG. 2(d)-1; FIG. 2(e)-1 shows a state after the web is further folded along lines BL6, BL7 in FIG. 2(d)-1; FIG. 2(e)-2 is a sectional view taken along a line 2(e)-2-2(e)-2 in FIG. 2(e)-1; FIG. 2(f)-1 shows a state after a gas generator 15 is arranged in an inner space formed by folding the web; FIG. 2(f)-2 is a sectional view taken along a line 2(f)-2-2(f)-2 in FIG. 2(f)-1; FIG. 2(f)-3 is a sectional view taken along a line 2(f)-3-2(f)-3 in FIG. 2(f)-1; FIG. 2(g)-1 shows a state after the web is further folded along a line BL8 in FIG. 2(f)-1; FIG. 2(g)-2 is a sectional view taken along a line 2(g)-2-2(g)-2 in FIG. 2(g)-1; FIG. 2(h)-1 shows a state after the web is further folded by accordion-folding nearly all portions at the side of the apex BP in FIG. 2(g)-1; and FIG. 2(h)-2 is a sectional view taken along a line 2(h)-2-2(h)-2 in FIG. 2(h)-1.

FIGS. 2(i)-2(l) show a process until the folded web 14 is completely covered by a protection cover 16, wherein FIG. 2(i) shows a state where the completely folded web is placed on the protection cover 16; FIG. 2(j) shows a state where the protection cover 16 is folded in a way shown in FIG. 2(i); FIG. 2(k) shows a state where the protection cover 16 is further folded in a way shown in FIG. 2(j); FIG. 2(l) shows a state where the protection cover 16 is further folded in a way shown in FIG. 2(k).

FIG. 3 is a cross-sectional view, taken along the line 3-3 of FIG. 2(l) of the side impact airbag device SAB as installed and secured.

FIGS. 4(a)-4(e) are views showing manufacturing processes of a side impact airbag device as an example of a modified airbag device according to the present invention, wherein FIG. 4(a) shows a web before folding; FIG. 4(b)-1 shows a state wherein the web is folded along a line BL1' in FIG. 4(a); FIG. 4(b)-2 is a view seen from an arrow 4(b)-2 in FIG. 4(b)-1; FIG. 4(c)-1 shows a state wherein the web is further folded along a line BL2' in FIG. 4(b)-1; FIG. 4(c)-2 is a view of the web seen from an arrow 4(c)-2 in FIG. 4(c)-1; FIG. 4(d)-1 shows a state wherein the web is further folded along a line BL3' in FIG. 4(c)-1; FIG. 4(d)-2 is a view of the web seen from an arrow 4(d)-2 in FIG. 4(d)-1; FIG. 4(e)-1 shows a state wherein the web is further folded along lines BL4', BL5' in FIG. 4(d)-1; and FIG. 4(e)-2 is a view of the web seen from an arrow 4(e)-2 in FIG. 4(e)-1.

FIGS. 5(a)-5(j) are views showing manufacturing processes of a side impact airbag device as an example of a modified airbag device according to the present invention, wherein FIG. 5(a)-1 shows a state wherein the web is further folded along lines BE4', BE5' in FIG. 4(e)-1; FIG. 5(a)-2 is a view of the web seen from an arrow 5(a)-2 in FIG. 5(a)-1; FIG. 5(a)-3 is a sectional view taken along a line 5(a)-3-5(a)-3 in FIG. 5(a)-1; FIG. 5(b)-1 shows a state where the web is further folded in a way shown as arrows in FIG. 5(a)-1; FIG. 5(b)-2 is a view seen from an arrow 5(b)-2 in FIG. 5(b)-1; FIG. 5(b)-3 is a sectional view taken along a line 5(b)-3-5(b)-3 in FIG. 5(b)-1; FIG. 5(c)-1 shows a state where the web is further folded in a way shown as arrows in FIG. 5(b)-2; FIG. 5(c)-2 is a view seen from an arrow 5(c)-2 in FIG. 5(c)-1; FIG. 5(c)-3 is a sectional view taken along a line 5(c)-3-5(c)-3 in FIG. 5(c)-1; FIG. 5(d)-1 shows a state where the web is further folded by accordion-folding shown in FIG. 5(c)-1; FIG. 5(d)-2 is a sectional view taken along a line 5(d)-2-5(d)-2 in FIG. 5(d)-1; FIG. 5(e)-1 shows a state where the web is further folded in a way shown as an arrow in FIG. 5(d)-2; FIG. 5(e)-2 is a sectional view taken along a line 5(e)-2-5(e)-2 in FIG. 5(e)-1; FIG. 5(f)-1 shows a state where the web is further folded in a way shown as an arrow in FIG. 5(e)-2; FIG. 5(f)-2 is a sectional view taken along a line 5(f)-2-5(f)-2 in FIG. 5(f)-1; FIG. 5(g) shows a state where the completely folded web is placed on the protection cover 16'; FIG. 5(h) shows a stated the protection cover is folded in a way shown as arrows in FIG. 5(g); FIG. 5(i) shows a state where the protection cover is folded in a way shown as arrows in FIG. 5(h); FIG. 5(j) shows a state where the protection cover is folded in a way shown as arrows in FIG. 5(i).

FIGS. 7(a)-7(c) show in detail the structure of an inflated and deployed practical airbag, wherein FIG. 7(a) is a side view as seen from outside of a vehicle; FIG. 7(b)-1 is a front view; FIG. 7(b)-2 is a partial sectional view taken along a line 7(b)-2-7(b)-2 in FIG. 7(b)-1; FIG. 7(c)-1 is a side view as seen from inside of the vehicle; FIG. 7(c)-2 is a partial sectional view taken along a line 7(c)-2-7(c)-2 in FIG. 7(c)-1; and, FIG. 7(c)-3 is a sectional view taken along a line 7(c)-3-7(c)-3 in FIG. 7(c)-1.

DETAILED DESCRIPTION OF THE PREFERRED EMBODIMENTS

Figure 1A:
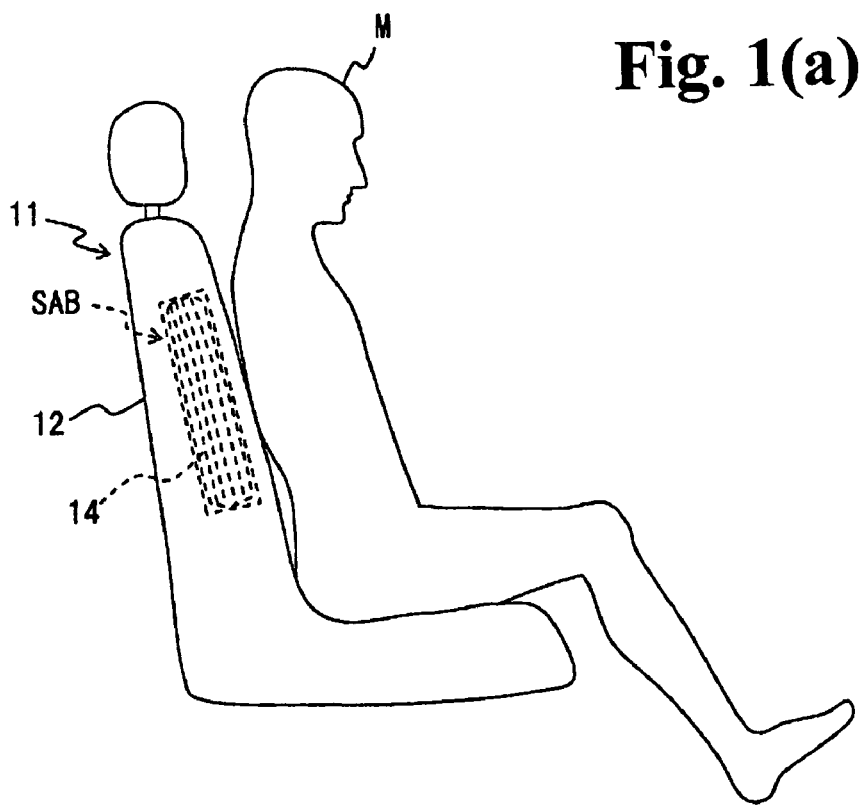
FIGS. 1(a), 1(b) are side views of a vehicle driver's seat showing a stored airbag and a deployed airbag of the side impact airbag device according to an embodiment of the present invention.
Figure 1B:
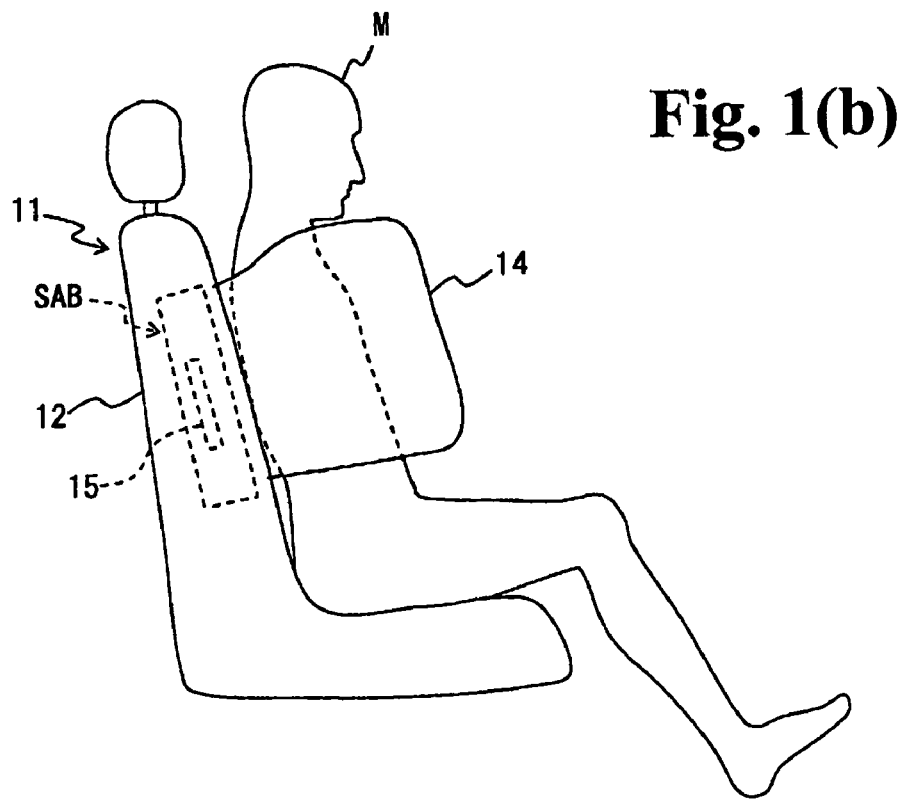

Embodiment according to the present invention will now be described with reference to the attached drawings. First, the present invention is described in terms of the first embodiment in which the present invention is applied to a side impact airbag device. FIG. 1(a) is a side view of a vehicle driver's seat showing the mounting location of the side impact airbag device SAB according to the first embodiment. FIG. 1(b) is a side view showing an exemplary inflation and deployment of the airbag of the side impact airbag device SAB. FIGS. 2(a) to 2(l) show manufacturing processes of the side impact airbag device SAB.

FIGS. 1(a) and 1(b) are side views, as seen from the right-hand side (right-hand side as seen from an occupant), of the driver's seat (right-hand seat as seen from the direction of travel of the vehicle) of a right-hand drive vehicle, in which an airbag inflates and deploys at the right-hand side of the seat, as seen from an occupant (likewise in FIGS. 6 and 9 to be mentioned later).

The side impact airbag device SAB as shown in FIGS. 1(a), 1(b) is an airbag device that is normally stored in a seat back 12 of a seat 11 in a passenger compartment, as shown in FIG. 1(a), and, as shown in FIG. 1(b), inflates and deploys an airbag 14 toward the side of an occupant M by causing a gas generator 15 to generate gas, the air bag being provided between the occupant M seated in a seat 11 and an interior side of a vehicle body in order to restrain an upper body of the occupant M when an impact force equal to or greater than a predetermined level is applied to a side of a vehicle.

As shown in FIG. 1(a), the airbag 14 is normally stored in a folded state in the seat back 12 of the seat 11. Meanwhile, for example, when a vehicle is subjected to a side collision, an inflator control circuit (not illustrated) triggers an initiator (not illustrated) of a gas generator 15 in the side impact airbag device SAB, thereby causing the ignited gas generator 15 to supply gas into the airbag 14. As shown in FIG. 1(b), when receiving gas supply, the airbag 14 splits a sewing line (not illustrated) provided in a cloth at, for example, the side of the seat back 12 and projects from the seat 11 along an interior side of the vehicle so as to deploy between the interior side and the occupant M seated in the seat.

Figure 2L:
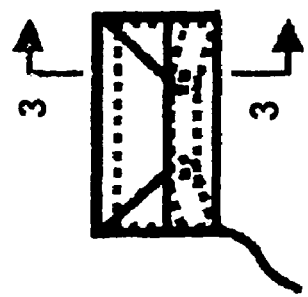
Figure 2K:
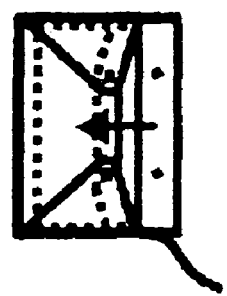
Figure 2J:
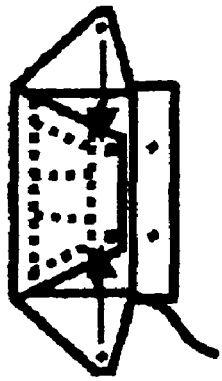
Figure 2I:
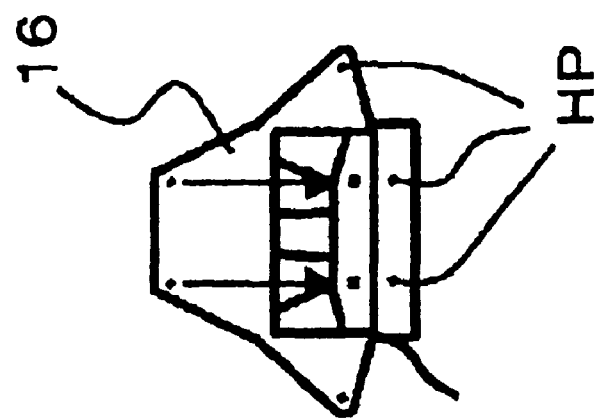

A process for assembling the airbag 14 of the side impact airbag device SAB described above is explained in detail below with reference to FIGS. 2(a) to 2(l). The airbag 14 of the side impact airbag device SAB described above consists of a sheet-shaped web 14A formed by cutting a web in a planar shape (a substantially square shape for an example as shown in the figure), as shown in FIG. 2(a). A web may be cut into a plurality of web sections which are then welded to form such a planar shape as shown in FIG. 2(a). The web 14A has a plurality of insertion holes HP (to be mentioned later) formed at its circumferential edges at appropriate positions thereof.

Figures 1, 4D:
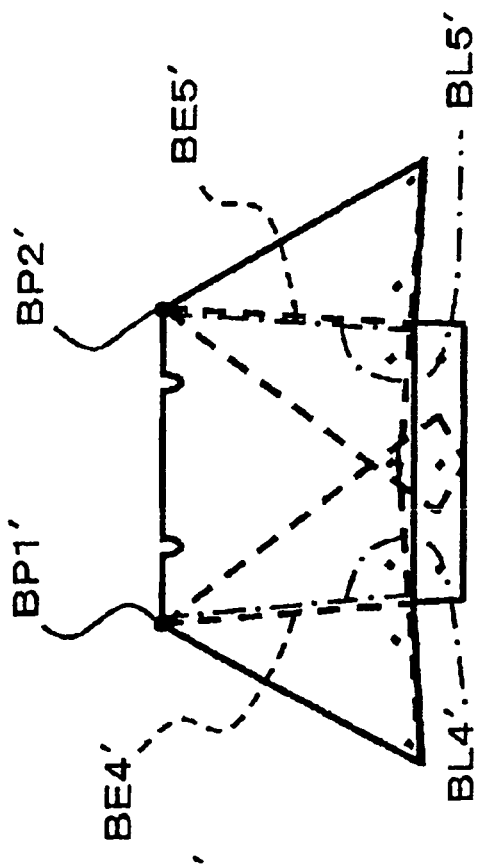

As shown in FIG. 2(b), a folding side BE1 (first folding side) in a closed state is formed by folding the substantially square-shaped web 14A once along a folding line BL1 corresponding to its diagonal line. Then, as shown in FIG. 2(c)-1, two folding sides (second folding sides) BE2, BE3 in a closed state are formed by further folding the web 14A along two folding lines BL2, BL3, which are at right angles to each other and each of which intersects at 45 degrees with the folding side BE1. The web 14A is folded along two folding lines BL2, BL3 toward the rear of the figure (see FIG. 2(c)-2).

Figures 2, 4D:
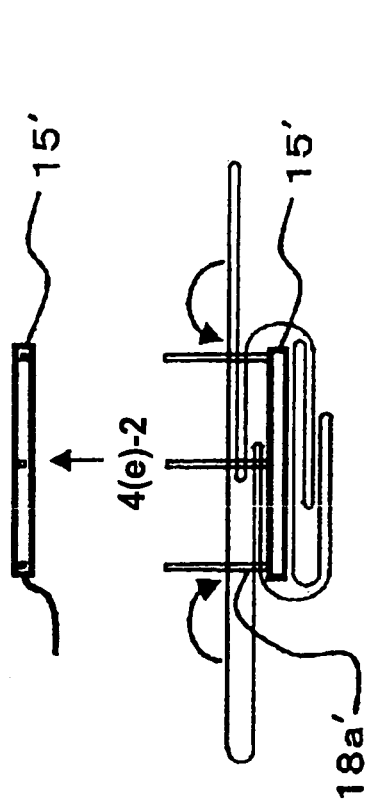
Figures 1, 4E:
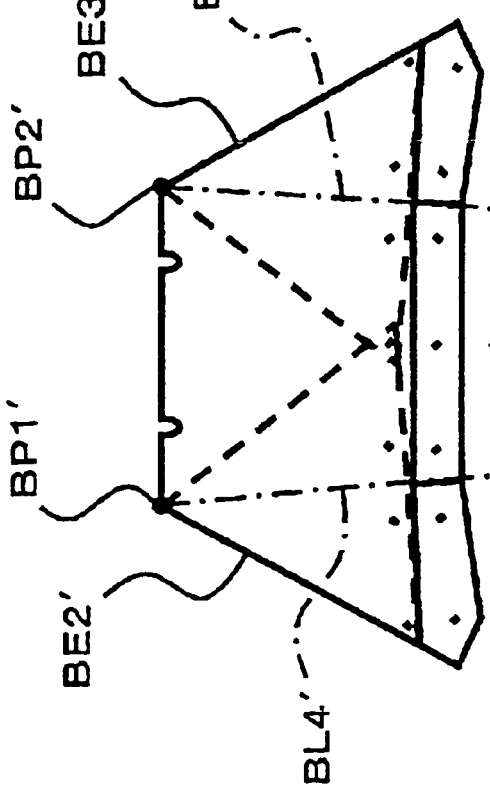
Figures 2, 4E:
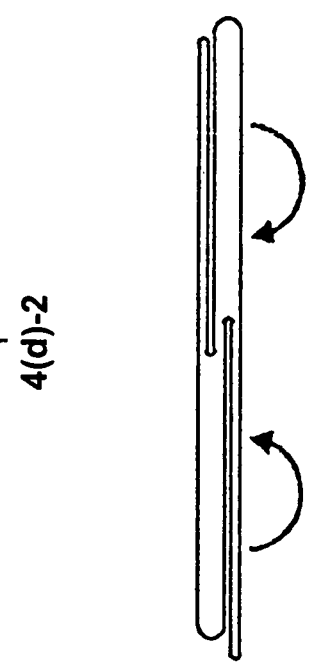

Then, as shown in FIG. 2(d)-1, two folding sides BE4, BE5 in a closed state are formed by folding (to the front of the figure as shown in FIG. 2(d)-2) the web 14 around an apex in a closed state located at the upper part of the figure along two folding lines BL4, BL5, which make angles of approximately 20 degrees with the folding lines BE2, BE3, respectively.

Then, as shown in FIG. 2(e)-1, two folding sides BE6, BE7 in a closed state are formed by folding (to the front of the figure as shown in FIG. 2(e)-2) the web 14 along two folding lines BL6, BL7, which are parallel to each other and intersect at approximately 25 degrees with the folding lines BE4, BE5, respectively.

Then, an inflator 15 (gas generator) is disposed in an inner space (between the sections of web 14A as shown in FIG. 2(b)) formed by folding the web 14A described above. The inflator 15 is formed in a substantially cylindrical shape in its entirety and is retained at its circumferential end by a retainer 18 (see FIG. 3 for details, and omitted in FIGS. 2(a)-2(l), 4(a)-4(e), 5(a)-5(j), and 7(a)-7(c)-1 to avoid complicated illustration). The retainer 18 has two male screws 18a (inserting members) provided at an outer circumferential side thereof so as to project parallel to each other. The insertion holes HP described above are formed in advance so as to insert the two inserting screws 18a therethrough and are adapted to overlap each other when the web 14A is folded in a proper manner, thereby allowing the male screws 18a to be inserted therethrough (see FIG. 3).

As shown in FIGS. 2(f)-1, 2(f)-2, 2(f)-3, after the inflator 15 has been disposed in the inner space of the web 14A, a folding side BE8 in a closed state is formed by folding (to the front of the figure as shown in FIG. 2(g)-2) the web 14A along a folding line BL8 parallel to an open side located opposite the apex BP above, as shown in FIG. 2(g)-1. This seals the inner space in the web 14A, resulting in formation of a bag. A signal cord 15b connected to the inflator 15 for transmitting a control signal is exposed to the outside through a predetermined hole (not illustrated).

Figures 2, 5D:
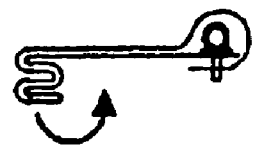
Figures 1, 5D:
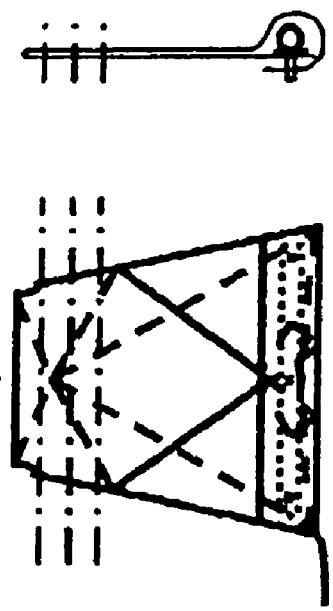
Figures 3, 5C:
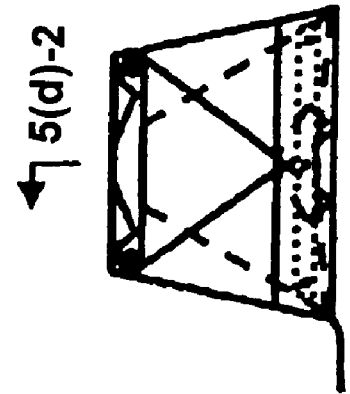
Figures 2, 5C:
Figure 2:
Figures 1, 5C:
Figure 5J:
Figure 5I:
Figure 5H:
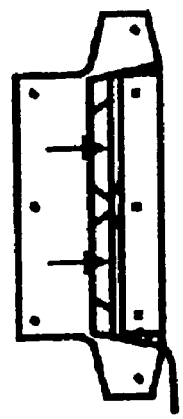
Figure 5G:
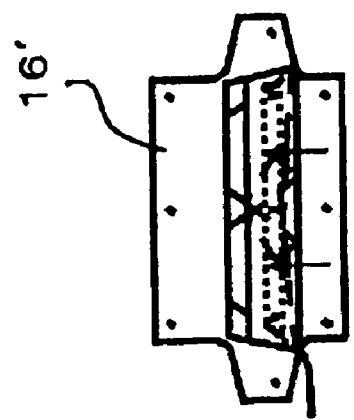

In FIG. 2(g)-1, the web 14A is folded so that all its circumferential edges (shaded portion in FIG. 2(a)) are gathered together at one location (a region having a certain amount of width) in the proximity of the inflator 15. In this embodiment, all the circumferential edges of the web 14A are joined by fitting nuts 17 to the male screws 18a provided in the retainer 18 for retaining the inflator 15 at its circumferential edge, as shown in FIG. 3. This arrangement allows the web 14A to form an airbag 14 as a bag having a substantially sealed space formed thereinside.

Then, in FIG. 2(g)-1, the web 14A can be formed into a compact body as shown in FIG. 2(h)-1 by accordion-folding nearly all portions at the side of the apex BP (see FIG. 2(h)-2). When appropriate, folding in a rolling manner other than accordion-folding may be used for folding the web 14A.

In order to maintain the compactness of the airbag 14, the airbag 14 is covered in its entirety with a protection cover 16, as shown in FIGS. 2(i) to 2(l). The protection cover 16 also has a plurality of insertion holes HP. The protection cover 16 is prevented from being released by inserting the male screw 18a through each of such insertion holes HP with the airbag 14 in a folded state.

FIG. 3 is a cross-sectional view, taken along the line 3-3 of FIG. 2(l) above, of the side impact airbag device SAB as installed and secured. In FIG. 3, as described above, the inflator 15 housed in the space inside the airbag 14 is supported at its circumferential edge by the retainer 18, and the retainer 18 has the male screw 18a provided at its outer circumferential side so as to project therefrom. The male screw 18a penetrates through a fixed wall portion 13 (wall portion of a reinforcement member provided inside the seat back 12 of the seat 11 for mounting the side impact airbag device thereon; not illustrated in FIGS. 1(a), 1(b)) and is fastened with the nut 17, thereby allowing the retainer 18 and the inflator 15 to be secured to the fixed wall portion 13. In this state, all the circumferential edges (shaded portion of FIG. 2(a)) of the web 14A (airbag 14) are gathered together and overlapped each other to a vicinity of the fixed wall portion 13 to which the web 14A is mounted, and the web 14A is sandwiched and secured (joined) between the retainer 18 and the nut 17 while keeping in close contact with the fixed wall portion 13.

In the foregoing description of the embodiment, the retainer 18, the male screw 18a, and the nut 17 function as joining members.

According to the side impact airbag device SAB having the structure described above, when constructing the airbag 14 as a bag with one sheet-shaped web 14A, it is sufficient to join open sides formed by overlapping the edges of the web 14A each other or overlapping the edge and the middle of the web 14A each other in order to maintain the inner space air-tight. The present invention allows the web 14A to be folded in such a manner that all its circumferential edges are gathered together and joined all together in order to maintain its air-tightness, thereby forming the airbag 14 as a bag having a sealed space thereinside. As described above, the airbag 14 constituting a bag can be formed only by subjecting one sheet-shaped web 14A to a folding process and a joining process, which eliminates the need for a circumferential edge sewing process (see FIG. 9) in which a relatively long sewing section must be sewn, thereby resulting in a significant reduction in manufacturing costs.

Even in the case of a web 14A having projections partially formed on the circumferential edges, although not illustrated, the airbag 14 as a bag having a sealed space thereinside can be formed by gathering and joining the base portions of the projections at the same location together with other edges, thereby providing the same function.

In this embodiment, particularly, the retainer 18, the male screw 18*a*, and the nut 17 are provided so that all the circumferential edges can be gathered together substantially one location so as to be overlapped each other, thereby allowing all the circumferential edges of the web 14A to be easily, stably joined as compared to welding and sewing.

In this embodiment, particularly, all the circumferential edges are gathered together in the proximity of a fixed portion for mounting the airbag 14, which allows all the circumferential edges gathered together and joined to be secured to a vicinity of the fixed portion for mounting the airbag 14 in a statically and dynamically stable manner, thereby allowing the airbag 14 to be inflated and deployed smoothly.

In this embodiment, particularly, the retainer 18 and the nut 17 sandwich the fixed wall portion 13, to which the airbag 14 is mounted, and all the circumferential edges therebetween, thereby securing the airbag 14 as well as joining all the circumferential edges all together.

The retainer 18 and the nut 17 enable to stably join all the circumferential edges and to secure the airbag 14, thereby achieving the compact airbag 14 as a whole.

In this embodiment, particularly, the first folding side BE1 in a closed state is formed by folding the web 14A once. In addition, the two folding sides BE2, BE3 in a closed state are formed by folding so as to intersect with the first folding side BE1, thereby allowing all the circumferential edges resulting from formation of the first folding side BE1 to be gathered together to a narrower region and folded together as a result of the formation of the second folding sides BE2, BE3. This causes all the circumferential edges to be concentrated substantially one location, thereby allowing air-tight joining.

In this embodiment, particularly, the protection cover 16 for covering the airbag 14 folded to a minimum size is provided, thereby maintaining the airbag 14 at a minimum size which allows easy handling.

The male screw 18*a* may be directly provided in the inflator 15 without providing to the retainer 18. In such a case, the inflator 15, the male screw 18*a*, and the nut 17 correspond to the joining member. This arrangement allows stable securing of the inflator 15 as well as implementation of the compact airbag 14. Also, the inflator 15 may be provided on the outside of the airbag 14 formed as a bag in such a manner that the gas released from the inflator 15 can be supplied to the inside of the airbag 14 through piping provided so as to connect the inflator 15 to the airbag 14.

In this embodiment, particularly, the insertion holes HP for inserting the male screw 18*a* for mounting the retainer 18 and the inflator 15 are provided at all the circumferential edges which are overlapped each other, thereby joining all the circumferential edges by inserting the male screw 18 through the insertion holes HP.

This arrangement allows the insertion holes HP to be overlapped each other so as to be aligned with each other to insert the male screw 18*a*, thereby allowing the web 14A to be folded with high precision.

The present invention is typically described with reference to, but not limited to, the foregoing preferred embodiments. Various modifications as shown below are conceivable within the scope of the present invention.

FIGS. 4(*a*) to 4(*e*) and FIGS. 5(*a*) to 5(*j*) are views showing manufacturing processes of a side impact airbag device SAB' as an example of modifications to the airbag device according to the present invention. As shown in FIG. 4(*a*), a web 14A' constituting an airbag 14' according to an example of the modifications is formed in a substantially hexagonal shape having a larger lateral length than the web 14A according to the embodiment above. A wider extended edge is formed at a lower edge of the figures. The wider extended edge in addition to the other circumferential edge constitutes the entire circumferential edge (shaded portion of FIG. 4(*a*)).

As shown in FIGS. 4(*b*)-1, 4(*b*)-2 a folding side (first folding side) BE1 in a closed state is formed by folding the web 14A' along a folding line BL1' corresponding to a lengthwise diagonal line of the substantially hexagonal shape. In addition, as shown in FIGS. 4(*c*)-1, 4(*d*)-1, two folding sides (second folding sides) BE2', BE3' are formed by folding the web 14A' along two folding lines BL2', BL3' (see FIG. 4(*b*)-2, 4(*c*)-2), respectively, each of which intersects at about 60 degrees with the folding side BE1'. Folding along the two folding lines BL2', BL3' in this example of modifications is made in such a manner that they are drawn inward (see FIG. 4(*c*)-2).

The web 14A' is folded along two folding lines BL4', BL5' that extend downward from two apexes BP1', BP2', located in an upper part of the figure, in a closed state, respectively. The two folding lines BL2', BL3' described above are folded in such a manner that they are drawn inward, whereby the folding sides BE2', BE3' above in a closed state are doubly formed (two folding sides in a closed state are overlapped each other at the front and the rear of the figure), namely, the folding sides BE2', BE3' correspond to two sets of folding sides, respectively (see FIG. 4(*d*)-2).

The folding surfaces which correspond to the two folding sides BE2', BE3' at the rear of the figure, respectively, are folded to the rear of the figure along the two folding lines BL4', BL5', respectively (see FIG. 4(*e*)-2). At this time, a downward extending portion of the figure is also folded to the rear. As shown in FIG. 4(*e*)-1, this results in formation of two folding sides BE4', BE5' in a closed state at the rear of the figure. With this arrangement, an inflator 15 is disposed inside an inner space formed by folding the web 14A'.

Then, the folding surfaces which correspond to the two folding sides BE2', BE3' at the front of the figure, respectively, are also folded to the front of the figure along the two folding lines BL4', BL5', respectively (see FIG. 5(*a*)-2), whereby two folding sides BE4', BE5' in a closed state are formed at the front of the figure, as shown in FIG. 5(*a*)-1. At this time, like the two folding sides BE2', BE3', the two folding sides BE4', BE5' are doubly formed, respectively.

In an inner space formed by thus folded web 14A', the inflator 15 is disposed at a location where all the circumferential edges are gathered together. Then, all the circumferential edges can be secured by inserting the male screw 18*a*' formed in the retainer 18' through the insertion holes HP which are formed in advance in all the circumferential edges (the inflator 15', the retainer 18', and the male screw 18a' for this example of modifications have the structure similar to those in the embodiment as shown in FIG. 3). Gathering and securing all the circumferential edges to substantially one location results in an airbag 14' having a sealed inner space (see FIG. 5(*a*)-3).

Subsequently, as shown in FIGS. 5(*b*)-5(*f*), the web 14A' is folded in a manner substantially similar to the embodiment above, and is subjected to the combination of accordion-folding and roll-folding for implementation of compact airbags. Then, such compact airbag is covered with a protection cover 16' to maintain the compactness as shown in FIGS. 5(*g*)-5(*j*).

The side impact airbag device SAB' provided with the airbag 14' having the structure described above also provides the effects similar to those provided by the embodiment described above. The airbag 14A' which is longitudinally longer than the airbag 14 in the above embodiment can be realized.

Supplemental sewing provided to an actual airbag and circumferential sewing whose need is eliminated by the airbag according to the present invention are detailed below with reference to the attached drawings.

Figure 6:
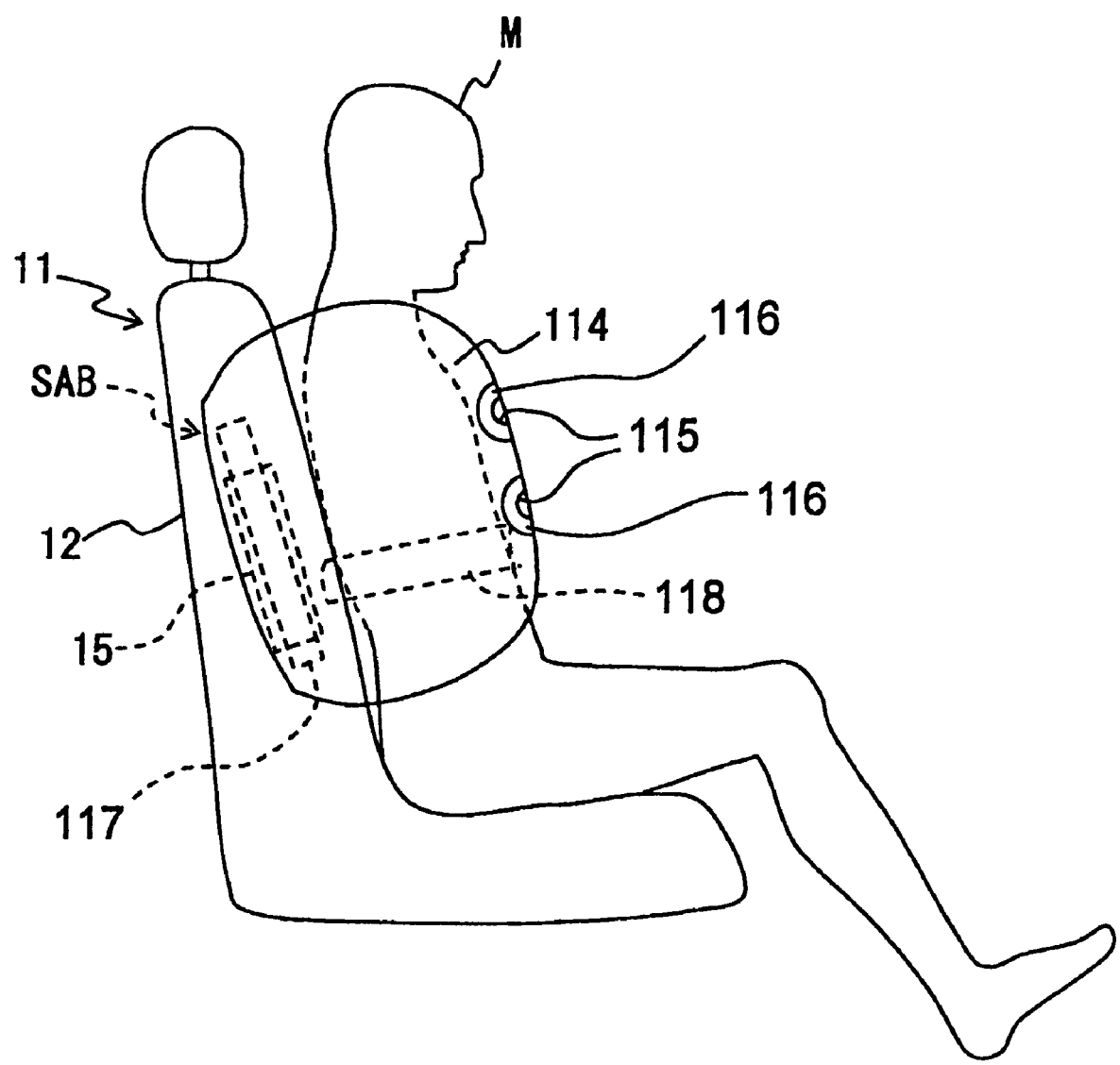
FIG. 6 is a side view showing that an example of an airbag of a practical side impact airbag device SAB inflates and deploys.

FIG. 6 is a side view showing that an example of an airbag of a practical side impact airbag device SAB inflates and deploys, which corresponds to FIG. 1(*b*) in the above embodiment. An example of an airbag as shown below basically consists of a sheet-shaped web, like the airbags 14, 14' as shown in the above embodiment and an example of its modifications. They are normally folded in a manner similar to the above embodiment and an example of its modifications and stored inside a seat back 12, and inflate and deploy toward the side of an occupant M in the event of an emergency, as shown in the figure. The reference numerals and symbols in FIG. 6 refer to the same components as those with the same reference numerals and symbols in the above embodiment and an example of its modifications, and repeated descriptions are omitted.

An inflated and deployed airbag 114 as shown in FIG. 6 as an example has two vent holes 115 vertically juxtaposed to each other at the front face thereof. The vent holes 115 are holes for releasing gas pressure that excessively increases in the airbag 114 in the course of inflating and deploying airbag 114 and restraining an occupant M. Each of the vent holes 115 has a vent hole reinforcement cloth installed by sewing at the peripheral edge thereof for reinforcing the peripheral edge thereof.

A mounting reinforcement cloth 117 is installed by sewing to the fixed portion for mounting the airbag 114, while a tether 118 for correcting the entire shape of the airbag 114 is installed by sewing to the inside of the airbag 114.

FIGS. 7(*a*)-(*c*) are views showing in detail the structure of an inflated and deployed airbag 114. FIG. 7(*a*) is a side view as seen from the outside of a vehicle. FIG. 7(*b*)-1 is a front view. FIG. 7(*c*)-1 is a side view as seen from the inside of a vehicle.

In FIGS. 7(*a*)-7(*c*), as described above, the airbag 114 includes the vent hole reinforcement cloth 116 installed at the peripheral edge of each of the two vent holes 115 formed at the front face thereof, the two mounting reinforcement cloths 117 provided at the fixed portion for mounting the airbag 114, and the tether 118 provided inside the airbag.

The two vent hole reinforcement cloths 116 are formed in a substantially annular shape, and are installed by sewing to the peripheral edge of the vent hole 115 formed in an oval shape (see FIG. 7(*b*)-2).

The two mounting reinforcement cloths 117 are formed in a rectangular shape having substantially the same size, and are overlapped and installed by sewing to a portion where the airbag 114 is mounted and the edges of the web 114A are gathered together (see FIG. 7(*c*)-2).

The tether 18 is formed in a substantially rectangular shape and is connected by sewing at both opposing ends thereof to the inboard side and the outboard side of an inner surface of the airbag 114 (see FIG. 7(*c*)-3). As described above, the tether 118 is provided so as to create a connection between both sides of the airbag 114, thereby placing restrictions on excessive lateral expansion of the airbag 114 as well as correcting the entire shape of the airbag 114 at the time of airbag inflation and deployment.

Figure 8A:
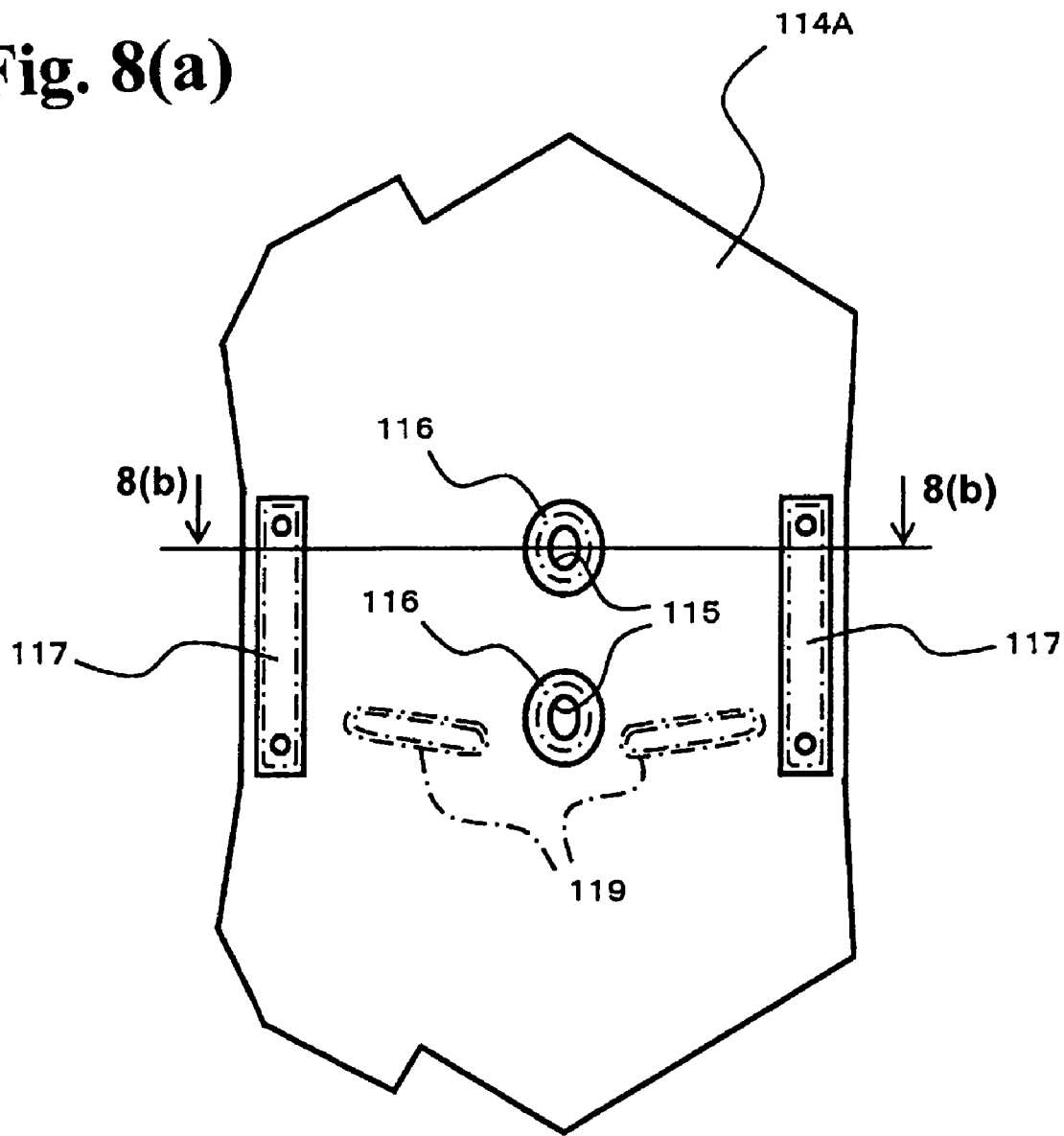
FIG. 8(a) is development plan view of a web of a practical airbag before it is folded.
Figure 8B:
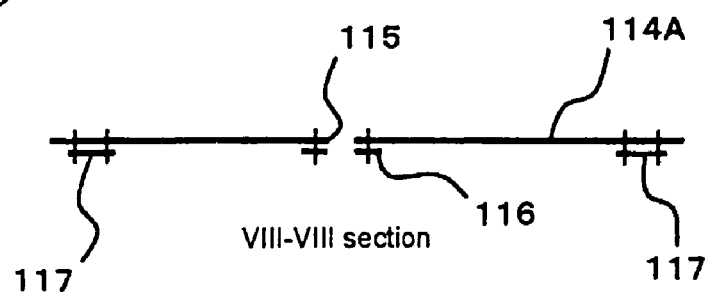
FIG. 8(b) is a sectional view taken along a line 8(b)-8(b) in FIG. 8(a).

FIG. 8(*a*) is a development plan view of a web 14A of the airbag 114 before it is folded. FIG. 8(*b*) is a sectional view taken along a line 8*b*-8*b* in FIG. 8(*a*).

A web 114A as shown as an example in FIG. 8 is formed in a long, substantially hexagonal shape. The two vent holes 115 are formed on the lengthwise diagonal line of this substantially diagonal shape, and the vent hole reinforcement cloths 116 are provided around the vent holes 115. Also, the mounting reinforcement cloths 117 are provided at both ends of the web 114A which are located so as to have the vent holes and the mounting reinforcement cloths therebetween. Furthermore, although the tether 118 is not illustrated, each of tether sewing portions 119 to which the tether 118 is sewed at its both ends are located between one (in lower part of the figure) of the vent hole 115 and each of the mounting reinforcement cloths 117 in this example.

In this example, sewing of the vent hole reinforcement cloth 116, the mounting reinforcement cloth 117, and the tether 118 into the web 114A corresponds to a supplemental sewing, which refers to sewing in a short sewing section in a relatively narrow region.

Figure 9:
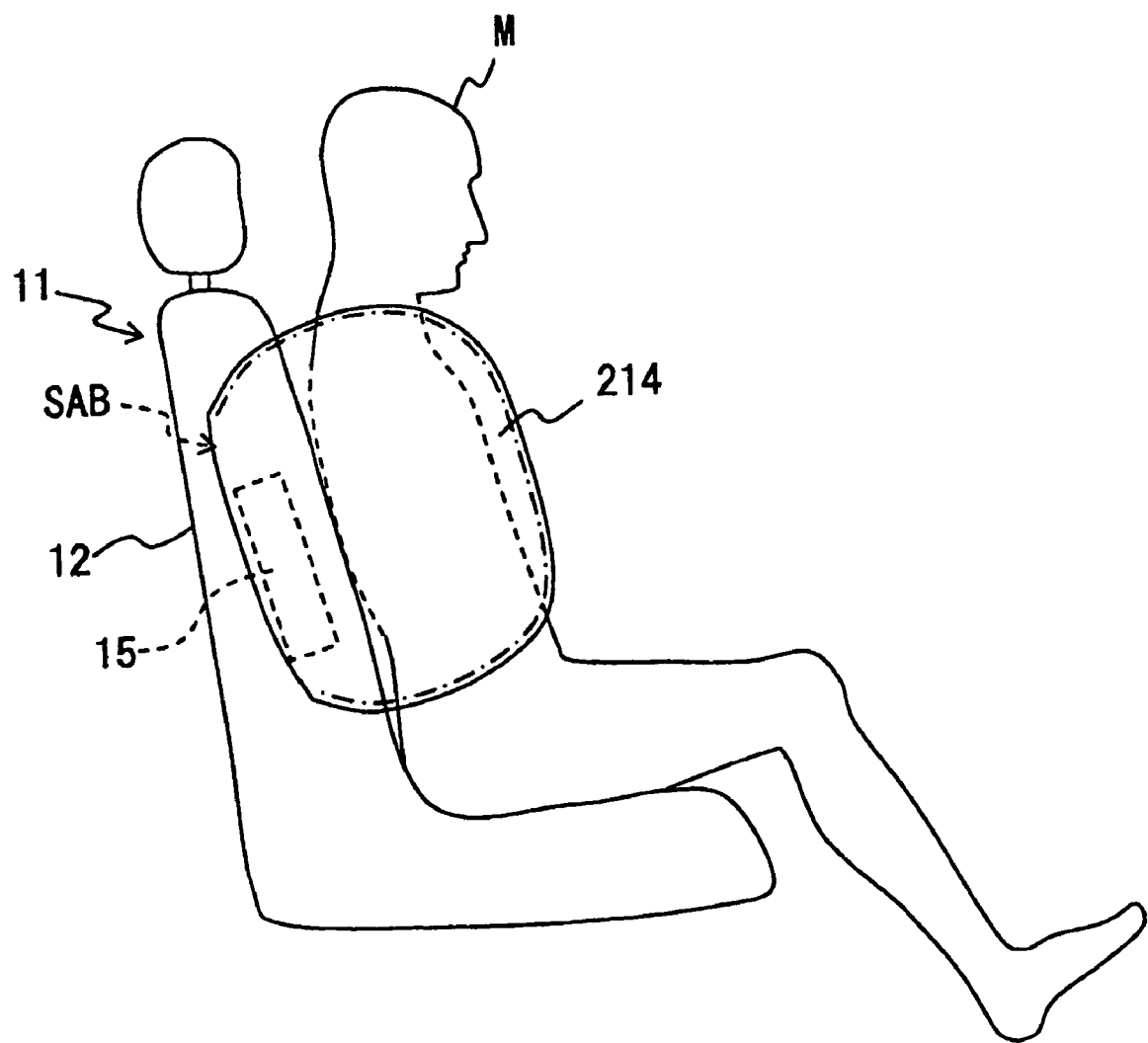
FIG. 9 is a side view showing for comparison that an airbag formed by sewing circumferential edges inflates and deploys.

FIG. 9 is a side view showing as a comparative example that an airbag formed by sewing circumferential edges inflates and deploys, corresponding to FIG. 1(*b*) and FIG. 6 in the embodiment described above.

In FIG. 9, an airbag 214 as shown as an example is formed as a bag by overlapping two sheets of web having substantially the same shape to each other (lapping is done in the front and the rear of the figure) and sewing their free edges with each other. The sewing of the free edges with each other corresponds to a circumferential sewing, which is a working process that affects the air-tightness and strength of the airbag 214, having a significant effect on the inflation/deployment performance and the restraint performance. Accordingly, it must be securely done over a long sewing section as compared to the supplemental sewing, accounting for a relatively large part of airbag manufacturing cost.

The airbag 14, 14', 114 is formed as a bag having a sealed inner space thereinside by folding one sheet-shaped web 14A, 14A', 114 so as to gather all its circumferential edges and joining all the circumferential edges all together so as to ensure the air-tightness, thereby eliminating the need for the above mentioned circumferential sewing. This results in a significant reduction in manufacturing cost (the supplementary sewing that can be done at relatively low cost can be separately performed).

The present invention is typically described with reference to, but not limited to, the foregoing preferred embodiments. Various modifications are conceivable within the scope of the present invention.

The disclosure of Japanese Patent Application No. 2008-219025, filed on Aug. 28, 2008, is incorporated in the application.

While the invention has been explained with reference to the specific embodiments of the invention, the explanation is illustrative and the invention is limited only by the appended claims.

What is claimed is:

1. An airbag for restraining an occupant, comprising:
a sheet-shaped web having a predetermined shape and a circumferential edge, said web being folded and arranged such that the circumferential edge is overlapped, gathered and joined together so as to form a substantially sealed inner space inside the airbag,
wherein the sheet-shaped web comprises a first folding side formed by folding the web once to a closed state, and at least one second folding side formed by folding the first folding side so as to intersect with the first folding side in the closed state.

2. The airbag according to claim 1, further comprising a protection cover for covering the airbag folded to a minimum size.

3. An airbag device, comprising:
the airbag according to claim 1, and
a gas generator for generating gas to inflate the airbag.

4. The airbag device according to claim 3, wherein the gas generator is secured to a joining member.

5. The airbag device according to claim 4, wherein said joining member has an inserting portion passing through the insertion holes so that the circumferential edge is joined by the inserting member.

6. The airbag according to claim 4, wherein the circumference edge overlapped and gathered together is fixed to each other only by the joining member without connection between the insertion holes.

7. An airbag for restraining an occupant, comprising:
a sheet-shaped web having a predetermined shape and a circumferential edge, said web being folded and arranged such that the circumferential edge is overlapped and gathered substantially in one location of the web and joined together so as to form a substantially sealed inner space inside the airbag,
wherein the web has a substantially square shape, and a first folding side corresponds to a diagonal line of the web.

8. The airbag according to claim 7, wherein at least one second folding side intersects with the first folding side at about 45 degrees at a middle of the first folding side.

9. An airbag device, comprising:
the airbag according to claim 7, and
a gas generator for generating gas to inflate the airbag.

* * * * *